US009500143B2

(12) United States Patent
Correia et al.

(10) Patent No.: US 9,500,143 B2
(45) Date of Patent: Nov. 22, 2016

(54) ALTERNATOR CONTROL SYSTEMS AND METHODS FOR VEHICLE DECELERATION (75) Inventors: Josef J. Correia, Waterford, MI (US); Christopher E. Whitney, Commerce, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 1168 days.

(21) Appl. No.: 13/302,532

(22) Filed: Nov. 22, 2011

(65) Prior Publication Data

US 2013/0096810 A1  Apr. 18, 2013

Related U.S. Application Data (60) Provisional application No. 61/547,401, filed on Oct. 14, 2011.

(51) Int. Cl.
| | |
|---|---|
| G06F 19/00 | (2011.01) |
| G06G 7/70 | (2006.01) |
| F02D 17/04 | (2006.01) |
| F02D 41/12 | (2006.01) |
| H02J 7/14 | (2006.01) |

(52) U.S. Cl.
CPC ............ F02D 17/04 (2013.01); F02D 41/123 (2013.01); H02J 7/1446 (2013.01)

(58) Field of Classification Search
CPC .... F02D 17/04; F02D 41/123; H02J 7/1446; B60W 10/08
USPC .............................. 701/112; 192/222; 477/92
See application file for complete search history.

(56) References Cited

U.S. PATENT DOCUMENTS

| | | | | |
|---|---|---|---|---|
| 5,655,407 A | * | 8/1997 | Dresden et al. | ............ 74/336 R |
| 8,131,430 B2 | | 3/2012 | Lecointre et al. | |
| 8,306,715 B2 | * | 11/2012 | Moriya | ................ F16H 61/143 192/3.28 |
| 8,417,428 B2 | | 4/2013 | Otake | |
| 8,790,218 B2 | * | 7/2014 | Morimura et al. | ............. 477/54 |
| 8,821,345 B2 | * | 9/2014 | Noumura | ............... F02D 29/02 477/121 |
| 8,996,283 B2 | * | 3/2015 | Morimura | ............... B60L 11/14 123/198 DB |
| 2008/0106829 A1 | * | 5/2008 | Sumimoto et al. | ............. 361/21 |
| 2009/0281693 A1 | | 11/2009 | Lecointre et al. | |
| 2010/0122573 A1 | * | 5/2010 | Tsutsumi et al. | .......... 73/114.38 |
| 2010/0286857 A1 | | 11/2010 | Otake | |

FOREIGN PATENT DOCUMENTS

| | | |
|---|---|---|
| CN | 1974285 A | 6/2007 |
| CN | 101460329 A | 6/2009 |
| CN | 101911470 A | 12/2010 |
| WO | WO 2011036810 A1 * | 3/2011 |

* cited by examiner

*Primary Examiner* — Mahmoud Gimie
*Assistant Examiner* — David Hamaoui (57) ABSTRACT

A system for a vehicle includes a fuel control module and a voltage setting module. The fuel control module cuts off fuel to an engine during a deceleration fuel cutoff (DFCO) event. During the DFCO event, the voltage setting module monitors a brake pedal position, sets a desired voltage to a first predetermined voltage when a brake pedal is not depressed, and sets the desired voltage to a second predetermined voltage when the brake pedal is depressed. The second predetermined voltage is greater than the first predetermined voltage. A regulator generates a pulse width modulation (PWM) signal based on the desired voltage and applies the PWM signal to an alternator.

18 Claims, 5 Drawing Sheets

ALTERNATOR CONTROL SYSTEMS AND METHODS FOR VEHICLE DECELERATION

CROSS-REFERENCE TO RELATED APPLICATIONS

This application claims the benefit of U.S. Provisional Application No. 61/547,401, filed on Oct. 14, 2011. The disclosure of the above application is incorporated herein by reference in its entirety.

FIELD

The present disclosure relates to internal combustion engines and more particularly to alternator control systems and methods.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Vehicles include an internal combustion engine that generates drive torque. An intake valve is selectively opened to draw air into a cylinder of the engine. The air mixes with fuel to form an air/fuel mixture. The air/fuel mixture is combusted within the cylinder. An exhaust valve is selectively opened to allow the exhaust gas resulting from combustion to exit the cylinder.

The engine outputs torque to a transmission via a crankshaft. An alternator and one or more other components are driven by the crankshaft via a belt/pulley arrangement. The alternator converts mechanical power from the engine into electrical power. The electrical power may be used, for example, to charge one or more batteries of the vehicle and/or to operate electrical components of the vehicle.

SUMMARY

A system for a vehicle includes a fuel control module and a voltage setting module. The fuel control module cuts off fuel to an engine during a deceleration fuel cutoff (DFCO) event. During the DFCO event, the voltage setting module monitors a brake pedal position, sets a desired voltage to a first predetermined voltage when a brake pedal is not depressed, and sets the desired voltage to a second predetermined voltage when the brake pedal is depressed. The second predetermined voltage is greater than the first predetermined voltage. A regulator generates a pulse width modulation (PWM) signal based on the desired voltage and applies the PWM signal to an alternator.

A method includes: cutting off fuel to an engine during a deceleration fuel cutoff (DFCO) event; and during the DFCO event: monitoring a brake pedal position; setting a desired voltage to a first predetermined voltage when a brake pedal is not depressed; and setting the desired voltage to a second predetermined voltage when the brake pedal is depressed. The second predetermined voltage is greater than the first predetermined voltage. A regulator generates a pulse width modulation (PWM) signal based on the desired voltage and applies the PWM signal to an alternator.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

An engine combusts an air/fuel mixture to generate drive torque. When the engine and a transmission are coupled, such as via a torque converter clutch or a manually engaged clutch, the engine outputs torque to the transmission. An engine control module (ECM) controls engine actuators to control torque output by the engine. For example, the ECM may control torque output by the engine based on one or more driver inputs, such as an accelerator pedal position and a brake pedal position.

Under some circumstances, the ECM may perform a deceleration fuel cutoff (DFCO) event. For example, the ECM may perform a DFCO event when the accelerator pedal is not depressed, a vehicle speed is greater than a predetermined speed (e.g., approximately 35 miles per hour), and the transmission and the engine are coupled. During the DFCO event, the ECM disables fuel injection to decrease fuel consumption, and the vehicle decelerates as air is pumped through the engine.

An alternator is coupled to the engine via a belt/pulley assembly. A regulator of the alternator controls a duty cycle of a PWM signal applied to the alternator based on a commanded voltage. The alternator converts mechanical energy from the engine into electrical energy. As the alternator converts mechanical energy into electrical energy, the alternator imposes a torque load on the engine. The torque load may increase as the commanded voltage increases and vice versa.

Under some circumstances, the ECM may increase the commanded voltage to increase the amount of mechanical energy converted into electrical energy during a DFCO event. However, the associated increase in the torque load may cause the vehicle to decelerate faster than expected by a driver. Additionally, the driver may depress the accelerator pedal in response to the faster deceleration, and the ECM may end the DFCO event when the accelerator pedal is depressed.

The engine may have one or more other torque loads on it at a given time. One torque load may be a friction load. The friction load may increase as a temperature of the engine (e.g., oil temperature) decreases and vice versa. Another torque load may be an air/conditioning (A/C) load imposed by an A/C compressor. The A/C load may also increase as temperature increases because the A/C compressor has to perform more cooling work.

During a DFCO event, the ECM of the present disclosure refrains from increasing the commanded voltage under some circumstances, such as when the engine and the transmission are decoupled, when the A/C load is greater than a predetermined load, and/or when the friction load is greater than a predetermined load. Increasing the commanded voltage (and causing the corresponding increase in the load imposed by the alternator) may cause the engine to stall when the engine and the transmission are decoupled during a DFCO event. Increasing the commanded voltage when the A/C load is greater than the predetermined load and/or the friction load is greater than the predetermined load may cause the vehicle to decelerate faster than a predetermined rate during a DFCO event. The faster vehicle deceleration may increase a probability of the engine stalling should the engine and the transmission be decoupled.

When the transmission and the engine are coupled and the A/C and friction loads are less than the predetermined loads during the DFCO event, the ECM may further increase the commanded voltage based on whether a brake pedal is depressed. Depression of the brake pedal indicates that the driver intends to decelerate the vehicle and, thus, the ECM can further increase the commanded voltage to generate additional electrical energy for storage and/or consumption.

Figure 1:
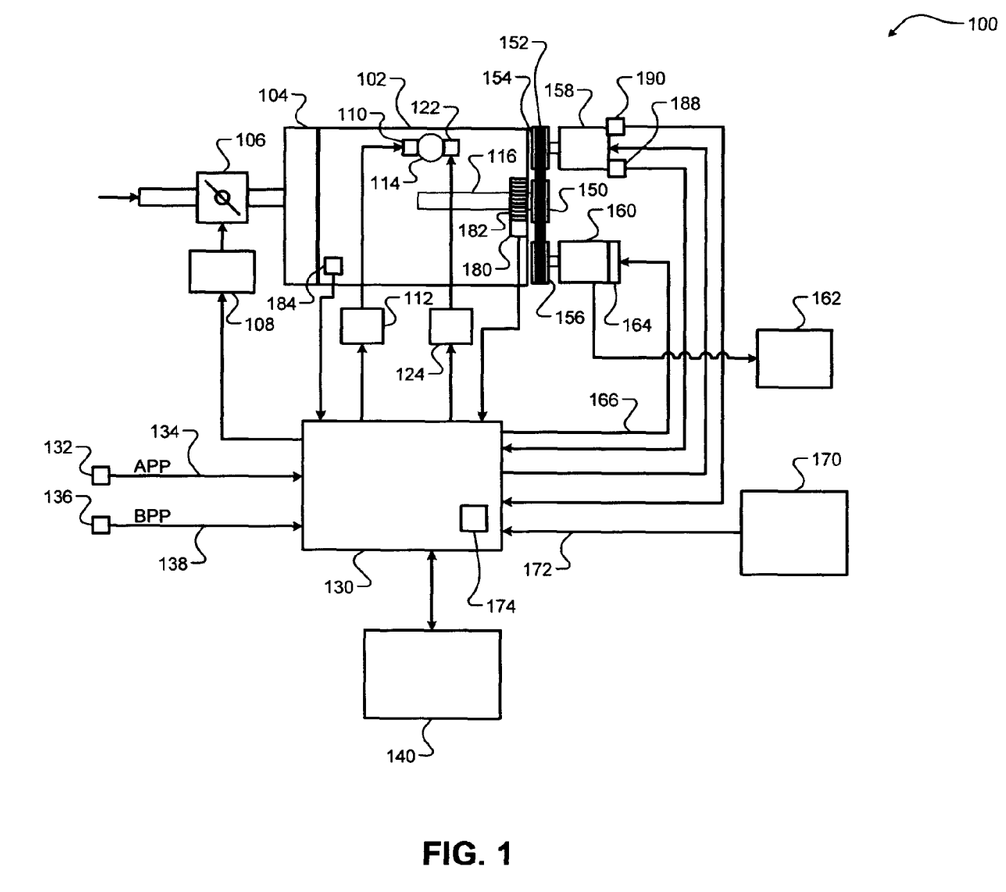
FIG. 1 is a functional block diagram of an example vehicle system according to the present disclosure.

Referring now to FIG. 1, a functional block diagram of an example vehicle system 100 is presented. An engine 102 generates torque for a vehicle. Air is drawn into the engine 102 through an intake manifold 104. Airflow into the intake manifold 104 may be varied by a throttle valve 106. A throttle actuator module 108 (e.g., an electronic throttle controller) controls opening of the throttle valve 106. One or more fuel injectors, such as fuel injector 110, mix fuel with the air to form a combustible air/fuel mixture. A fuel actuator module 112 controls the fuel injectors.

A cylinder 114 includes a piston (not shown) that is coupled to a crankshaft 116. Although the engine 102 is depicted as including only the cylinder 114, the engine 102 may include more than one cylinder. The fuel injectors may inject fuel directly into the cylinders or at another suitable location. One combustion cycle of the cylinder 114 may include four strokes: an intake stroke, a compression stroke, an expansion stroke, and an exhaust stroke. During one revolution of the crankshaft 116 (i.e., 360 degrees of crankshaft rotation), two of the four strokes may occur. One engine cycle may include each of the cylinders undergoing one combustion cycle. One engine cycle may occur over two revolutions of the crankshaft 116 (i.e., 720 degrees of crankshaft rotation).

During the intake stroke, the piston is lowered to a bottom most position, and air and fuel may be provided to the cylinder 114. The bottom most position may be referred to as a bottom dead center (BDC) position. Air enters the cylinder 114 through one or more intake valves (not shown) associated with the cylinder 114. One or more exhaust valves (not shown) are also associated with the cylinder 114. For purposes of discussion only, only one intake valve and one exhaust valve will be discussed.

During the compression stroke, the crankshaft 116 drives the piston toward a top most position. The top most position may be referred to as a top dead center (TDC) position. The intake valve and the exhaust valve are both closed during the compression stroke, and the piston compresses the contents of the cylinder 114. A spark plug 122 may ignite the air/fuel mixture during operation of the engine 102. A spark actuator module 124 controls the spark plug 122.

Combustion of the air/fuel mixture drives the piston back toward the BDC position during the expansion stroke. The piston drives the crankshaft 116. The rotational force (i.e., torque) on the crankshaft 116 from combustion of the air/fuel mixture may be a source of compressive force for a compression stroke of a combustion cycle of a next cylinder in a predetermined firing order of the cylinders. Exhaust resulting from the combustion of the air/fuel mixture is expelled from the cylinder 114 during the exhaust stroke. While the engine 102 is described as a four-stroke engine, the engine 102 may be another suitable type of engine.

An engine control module (ECM) 130 controls the throttle valve 106 via the throttle actuator module 108 and controls the fuel injectors via the fuel actuator module 112. The ECM 130 controls the spark plugs via the spark actuator module 124. The ECM 130 may also control one or more other engine actuators, such as one or more camshaft phasers, one or more valve lift actuators, one or more boost devices, an exhaust gas recirculation (EGR) valve, etc.

The ECM 130 may control the engine actuators to produce a target engine output. The ECM 130 may determine the target engine output, for example, based on one or more driver inputs. The driver inputs may include, for example, one or more accelerator pedal positions (APPs), one or more brake pedal positions (BPPs), cruise control inputs, and other suitable driver inputs.

An APP sensor 132 measures a position of an accelerator pedal (not shown) and generates an APP signal 134 based on the position of the accelerator pedal. A BPP sensor 136 measures position of a brake pedal (not shown) and generates a BPP signal 138 based on the position of the brake pedal. The accelerator pedal is in a resting position when the accelerator pedal is not being depressed by the driver. The brake pedal is in a resting position when the brake pedal is not being depressed by the driver.

The APP sensor 132 may set the APP signal 134 to an active state when the accelerator pedal is in the resting position and set the APP signal 134 to an inactive state when the accelerator pedal is not in the resting position. One or more other APP sensors may be provided. Another APP sensor may, for example, generate an APP signal based on how far the driver has depressed the accelerator pedal relative to the resting position. The BPP sensor 136 may set the BPP signal 138 to an active state when the brake pedal is in the resting position and set the BPP signal 138 to an inactive state when the brake pedal is not in the resting position. One or more other BPP sensors may be provided.

The engine 102 outputs torque to a transmission (not shown) via the crankshaft 116. In implementations where the transmission includes an automatic transmission, a clutch to clutch transmission, a dual clutch transmission, or another type of non-manual transmission, a transmission control module (TCM) 140 controls operation of the transmission.

The TCM 140 may control, for example, engagement and disengagement of one or more torque transfer devices of the transmission, such as clutches, bands, etc. The TCM 140 may also control engagement and disengagement of a torque converter clutch in transmissions including a torque converter. The TCM 140 and the ECM 130 may share data. For example only, the TCM 140 may transmit a transmission state to the ECM 130. The transmission state indicates whether the engine 102 and the transmission are coupled or decoupled.

In implementations where the transmission is a manual transmission, the driver may actuate a clutch pedal to couple/decouple the engine 102 to/from the transmission. One or more clutch pedal position (CPP) sensors may measure a position of the clutch pedal and generate CPP signals based on the position of the clutch pedal.

A crankshaft pulley 150 is attached to and rotates with the crankshaft 116. A belt 152, chain, or other suitable device encircles the crankshaft pulley 150 and one or more other pulleys. For example only, the belt 152 encircles an air/conditioner (A/C) pulley 154 and an alternator pulley 156 in FIG. 1 and may encircle one or more other pulleys. The crankshaft pulley 150 drives the belt 152, and the belt 152 drives the A/C pulley 154 and the alternator pulley 156.

The A/C pulley 154 is coupled to an A/C shaft (not numbered) that is selectively coupled to an A/C compressor 158 via an A/C compressor clutch (not shown). The ECM 130 may control engagement and disengagement of the A/C compressor clutch. When the A/C compressor clutch is engaged, the engine 102 drives the A/C compressor, and the A/C compressor imposes a torque load on the engine 102.

The alternator pulley 156 is coupled to an alternator shaft (not numbered) that is coupled to an alternator 160. Based on current through windings of the alternator 160, the alternator 160 converts mechanical energy from the engine 102 into electrical energy. Electrical energy output by the alternator 160 may be stored in a battery 162. One or more electrical components of a vehicle may draw electrical energy for operation. The alternator 160 is a conventional alternator and is not a generator of torque that supplements or replaces engine torque output.

A regulator 164 controls current through the windings of the alternator 160 based on a commanded voltage 166 for an L-terminal of the alternator 160. The regulator 164 may apply a PWM signal to the L-terminal of the alternator 160 based on the commanded voltage 166. More specifically, the regulator 164 may determine a duty cycle for the PWM signal as a function of the commanded voltage 166 and apply the PWM signal (at the duty cycle) to the alternator 160.

A body control module (BCM) 170 generates a BCM desired voltage 172. The BCM 170 may generate the BCM desired voltage, for example, based on a state of charge (SOC) of the battery 162, present electrical loads, and/or one or more other suitable parameters. A voltage command module 174 (see also FIGS. 2A-2B) generates the commanded voltage 166 based on the BCM desired voltage 172 and/or one or more other parameters.

A crankshaft position sensor 180 monitors an N-toothed wheel 182 and generates a crankshaft position signal based on rotation of the N-toothed wheel 182. For example only, the crankshaft position sensor 180 may include a variable reluctance (VR) sensor or another suitable type of crankshaft position sensor. The N-toothed wheel 182 rotates with the crankshaft 116.

An oil temperature (OT) sensor 184 measures a temperature of engine oil and generates an OT signal based on the temperature of the engine oil. An engine coolant temperature (ECT) may be implemented to measure a temperature of engine coolant and generate an ECT signal accordingly. The A/C compressor 158 may include a variable position pump. A pump position sensor 188 may measure a position of the variable position pump and generate a pump position signal based on the position. A pressure sensor 190 may measure pressure of refrigerant output by the A/C compressor and generate a pressure signal based on the pressure of the pressure. One or more other sensors may also be implemented.

Figure 2A:
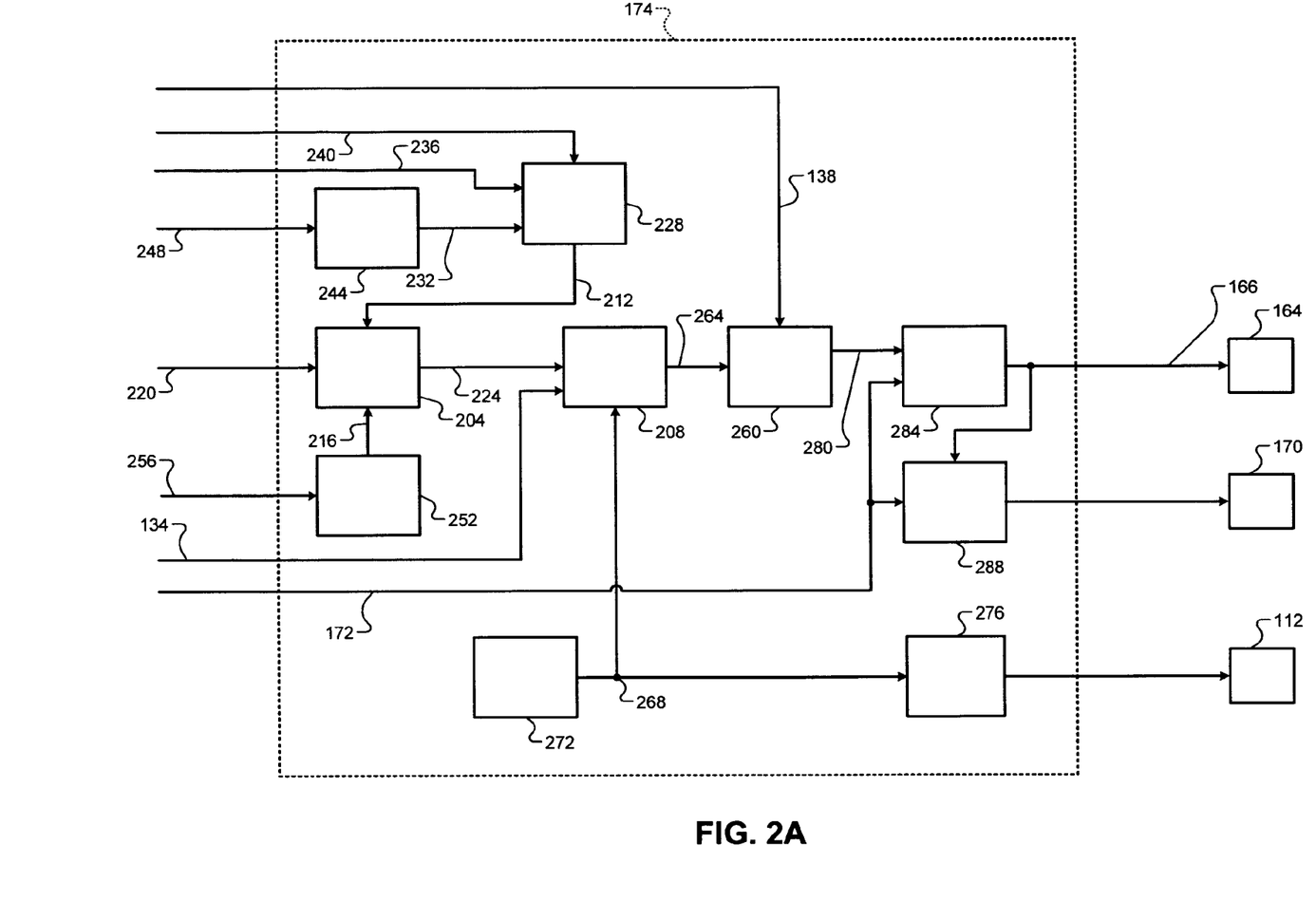
FIGS. 2A-2B are functional block diagrams of example alternator control systems according to the present disclosure.

Referring now to FIG. 2A, a functional block diagram of an example alternator control system is presented. A disabling module 204 selectively enables and disables a triggering module 208. The disabling module 204 selectively enables and disables the triggering module 208 based on an A/C load 212, a friction load 216, and a transmission state 220. The transmission state 220 may be provided by the TCM 140 and indicate whether the transmission (specifically, at least one axle) is decoupled from the engine 102 or coupled to the engine 102. The transmission state 220 may be based on, for example, a state of the torque converter and a gear state of the transmission (e.g., whether the transmission is in drive, neutral, etc.). In implementations where the transmission is a manual transmission, the ECM 130 may determine the transmission state 220 based on whether a CPP indicates that the clutch pedal is depressed.

The disabling module 204 may disable the triggering module 208 when at least one of: (i) the transmission is decoupled from the engine 102; (ii) the A/C load 212 is greater than a first predetermined load; and (iii) the friction load is greater than a second predetermined load. Conversely, the disabling module 204 may enable the triggering module 208 when all of: (i) the transmission is coupled to the engine 102; (ii) the A/C load 212 is not greater than the first predetermined load; and (iii) the friction load is not greater than the second predetermined load. For example only, the first predetermined load may be approximately 15 Newton meters (Nm) or another suitable value, and the second predetermined load may be approximately 10 Nm or another suitable value.

The disabling module 204 may enable and disable the triggering module 208 via a disable signal 224. The disabling module 204 may, for example, set the disable signal 224 to an active state to disable the triggering module 208. The disabling module 204 may set the disable signal 224 to an inactive state to enable the triggering module 208.

The A/C load 212 corresponds to a torque load (e.g., Nm) imposed on the engine 102 by the A/C compressor 158. An A/C load module 228 determines the A/C load 212. The A/C load module 228 may determine the A/C load 212 based on an engine speed 232, a pump position 236, and/or a pump pressure 240. The A/C load module 228 may determine the A/C load 212 using one of a function and a mapping that relates the engine speed 232, the pump position 236, and the pump pressure 240 to the A/C load 212. The pump position 236 may be measured using the pump position sensor 188. The pump pressure 240 may be measured using the pressure sensor 190.

An engine speed module 244 may determine the engine speed 232. The engine speed 232 corresponds to a rotational speed (e.g., in revolutions per minute or RPM) of the crankshaft 116. The engine speed module 244 may determine the engine speed 232 based on a crankshaft position 248 measured using the crankshaft position sensor 180.

The friction load 216 corresponds to a torque load (e.g., Nm) imposed on the engine 102 by friction. A friction load module 252 may determine the friction load 216, for example, based on an oil temperature 256 measured using the OT sensor 184 and/or one or more other suitable indicators of the friction load on the engine 102, such as engine coolant temperature. The friction load module 252 may determine the friction load 216 using one of a function and a mapping that relates the oil temperature 256 to the friction load 216. The friction load 216 increases as the oil temperature 256 decreases and vice versa.

When enabled, the triggering module 208 selectively triggers a voltage setting module 260. The triggering module 208 selectively triggers the voltage setting module 260 based on whether the accelerator pedal is in the resting position and whether deceleration fuel cutoff (DFCO) is being performed. The triggering module 208 triggers the voltage setting module 260 when the accelerator pedal is in the resting position (i.e., the accelerator pedal is not depressed) and DFCO is being performed. Conversely, the triggering module 208 may refrain from triggering the voltage setting module 260 when the accelerator pedal is not in the resting position (i.e., the accelerator pedal is depressed) and/or DFCO is not being performed.

The triggering module 208 may trigger the voltage setting module 260 via a trigger signal 264. For example, the triggering module 208 may set the trigger signal 264 to an active state to trigger the voltage setting module 260 and set the trigger signal 264 to an inactive state to not trigger the voltage setting module 260.

Whether the accelerator pedal is in the resting position may be indicated by the APP signal 134 generated using the APP sensor 132. Whether DFCO is being performed may be indicated by a DFCO signal 268. A DFCO module 272 controls performance of DFCO using the DFCO signal 268. The DFCO module 272 may, for example, set the DFCO signal 268 to an active state to command performance of DFCO. Otherwise, the DFCO module 272 may set the DFCO signal 268 to an inactive state. The DFCO module 272 may command performance of DFCO, for example, when the accelerator pedal is in the resting position, a vehicle speed is greater than a predetermined speed (e.g., approximately 35 miles per hour), the transmission and the engine 102 are coupled, and one or more other suitable DFCO enabling conditions are satisfied.

A fuel control module 276 disables fueling to the engine 102 while DFCO is commanded. While fueling is disabled, the engine 102 continues to pump air through the engine 102. Pumping air through the engine 102 slows the vehicle. As fueling is disabled, however, fuel is conserved as the vehicle slows.

When triggered, the voltage setting module 260 sets an ECM desired voltage 280 to one of a first predetermined voltage and a second predetermined voltage based on whether the brake pedal is in the resting position (i.e., whether the brake pedal is depressed). When the brake pedal is in the resting position (i.e., the brake pedal is not depressed), the voltage setting module 260 sets the ECM desired voltage 280 to the first predetermined voltage. When the brake pedal is not in the resting position (i.e., whether the brake pedal is depressed), the voltage setting module 260 sets the ECM desired voltage 280 to the second predetermined voltage. When not triggered, the voltage setting module 260 may set the ECM desired voltage 280, for example, to the BCM desired voltage 172 or to another suitable value.

The second predetermined voltage is greater than the first predetermined voltage. For example only, the second predetermined voltage may be approximately 15.5 Volts (V) or another suitable value, and the first predetermined voltage may be approximately 14.5 V or another suitable value. In this manner, the ECM desired voltage 280 is greater when the driver is applying the brakes. Whether the brake pedal is in the resting position may be indicated by the BPP signal 138 generated using the BPP sensor 136.

A voltage control module 284 generates the commanded voltage 166 based on the ECM desired voltage 280 and the BCM desired voltage 172. The voltage control module 284 may select a greater one of the ECM desired voltage 280 and the BCM desired voltage 172 and generate the commanded voltage 166 based on the greater one of the ECM desired voltage 280 and the BCM desired voltage 172. The voltage control module 284 may rate limit changes in the commanded voltage 166. In other words, the voltage control module 284 may adjust the commanded voltage 166 by up to a predetermined amount during each control loop.

The regulator 164 generates a PWM signal based on the commanded voltage 166 and applies the PWM signal to the L-terminal of the alternator 160. The regulator may, for example, determine a duty cycle of the PWM signal based on the commanded voltage 166, and apply the PWM signal having the duty cycle to the alternator 160.

The voltage command module 174 may also include a BCM notification module 288. The BCM notification module 288 may notify the BCM 170 whether the commanded voltage 166 is being generated based on the BCM desired voltage 172. For example only, the BCM notification module 288 may compare the commanded voltage 166 and the BCM desired voltage 172. The BCM notification module 288 may notify the BCM 170 that the commanded voltage 166 is being generated based on the BCM desired voltage 172 when the commanded voltage 166 is equal to the BCM desired voltage 172. The BCM notification module 288 may notify the BCM 170 that the commanded voltage 166 is not being generated based on the BCM desired voltage 172 when the commanded voltage 166 is greater than the BCM desired voltage 172.

Figure 2B:
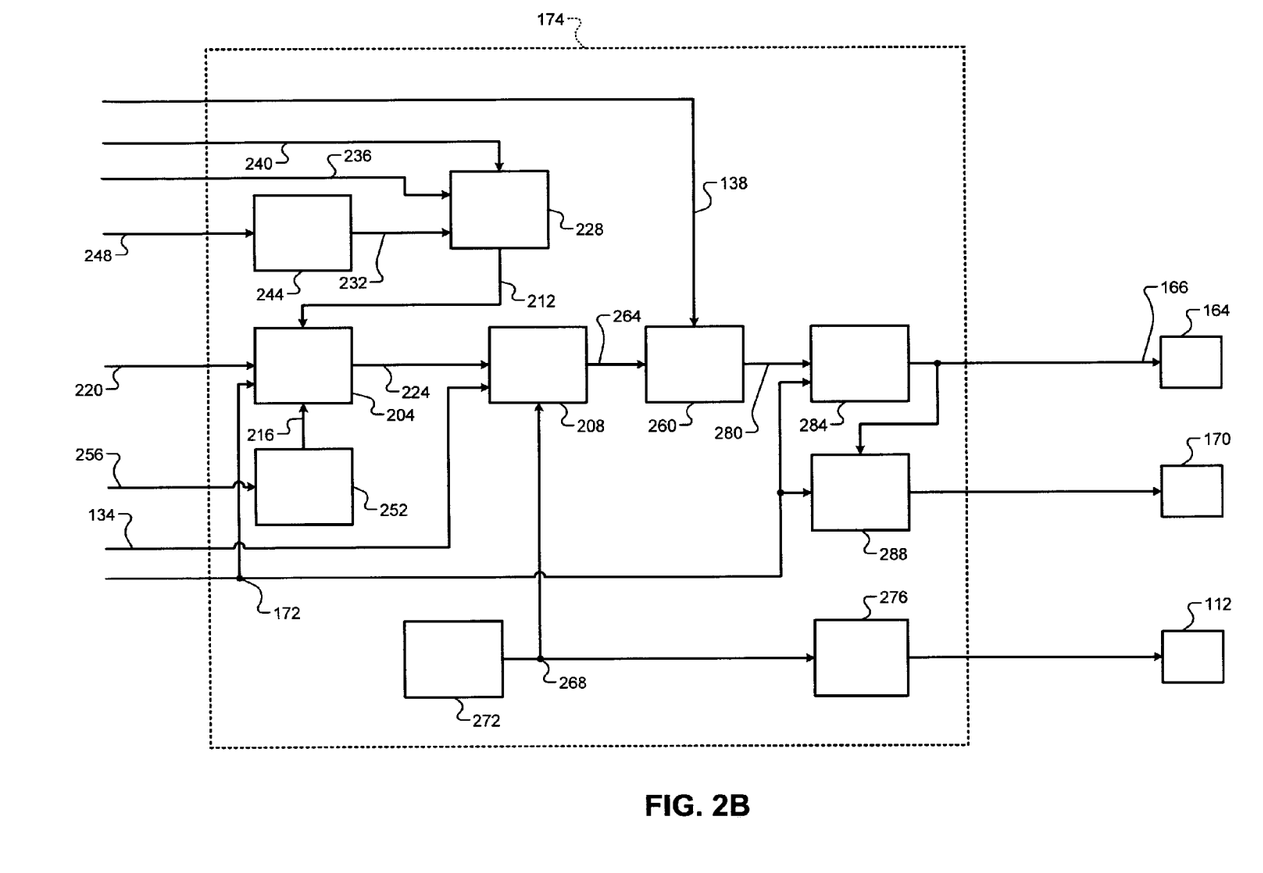

Referring now to FIG. 2B, a functional block diagram of another example alternator control system is presented. The disabling module 204 may selectively enable and disable the triggering module 208 further based on the desired BCM voltage 172. More specifically, in addition to the above, the disabling module 204 may also disable the triggering module 208 when the BCM desired voltage 172 is greater than a predetermined voltage. Conversely, the disabling module 204 may enable the triggering module 208 when all of: (i) the transmission is coupled to the engine 102; (ii) the A/C load 212 is not greater than the first predetermined load; (iii) the friction load is not greater than the second predetermined load; and (iv) the BCM desired voltage 172 is not greater than the predetermined voltage. For example only, the predetermined voltage may be approximately 13 V or another suitable voltage that is less than the first predetermined voltage.

Figure 3:
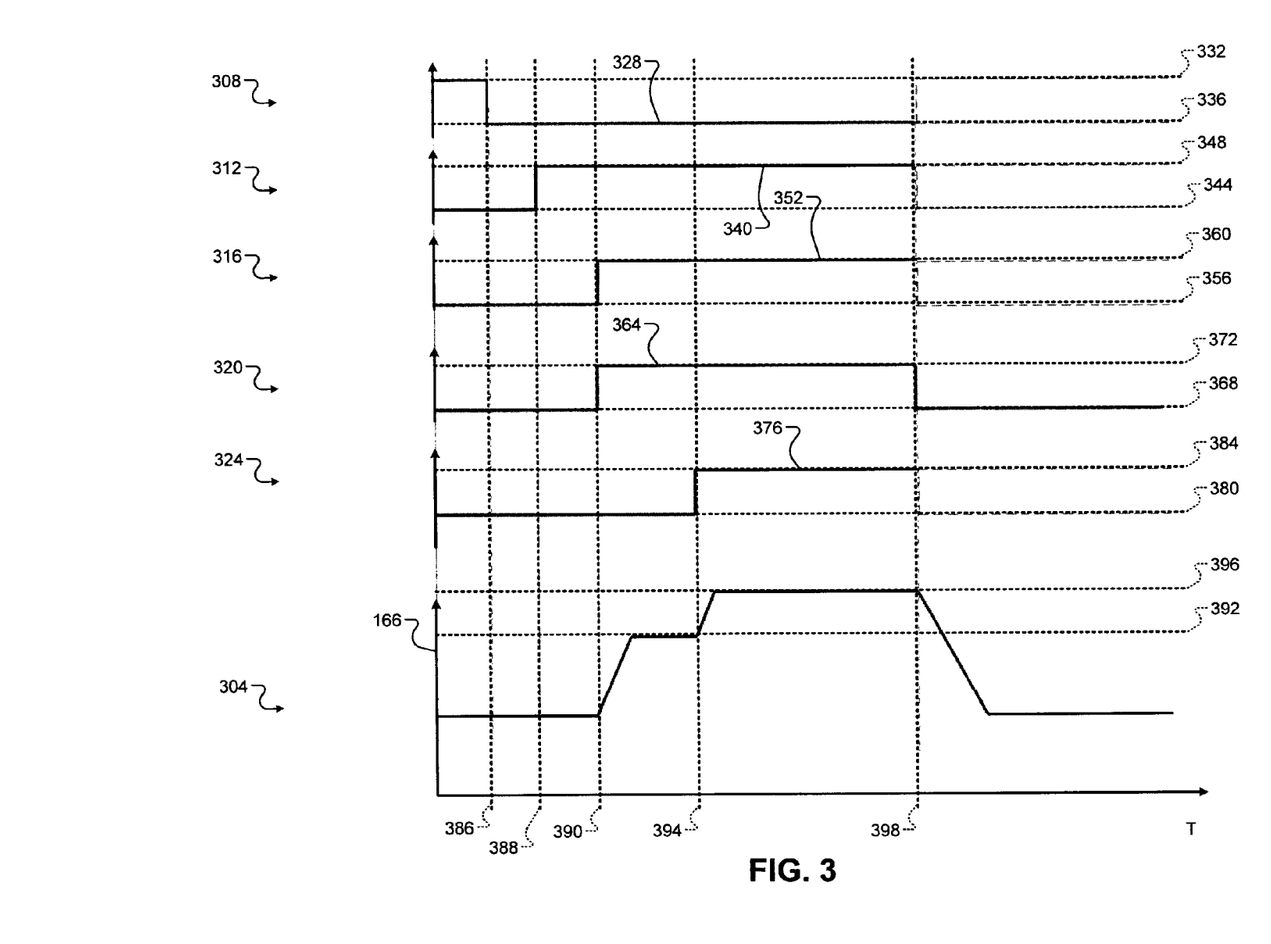
FIG. 3 includes example graphs including an example graph of commanded voltage for an L-terminal of an alternator.

FIG. 3 includes an example graph 304 of the commanded voltage 166 as a function of time. FIG. 3 also includes example graphs 308, 312, 316, 320, and 324. The graph 308 indicates whether one or more of the conditions for disabling the triggering module 208 (disabling conditions) are present. For example, trace 328 may be in a first state 332 when at least one of: (i) the transmission is decoupled from the engine 102; (ii) the A/C load 212 is greater than the first predetermined load; (iii) the friction load is greater than the second predetermined load; and (iv) the BCM desired voltage 172 is greater than the predetermined voltage. Conversely, the trace 328 may be in a second state 336 when all of: (i) the transmission is coupled to the engine 102; (ii) the A/C load 212 is not greater than the first predetermined load; (iii) the friction load is not greater than the second predetermined load; and (iv) the BCM desired voltage 172 is not greater than the predetermined voltage.

The graph 312 indicates whether the accelerator pedal is in the resting position. For example, trace 340 may be in a first state 344 when the accelerator pedal is not in the resting position. Conversely, the trace 340 may be in a second state 348 when the accelerator pedal is in the resting position. The graph 316 indicates whether DFCO is being performed. For example, trace 352 may be in a first state 356 when DFCO is not being performed. Conversely, the trace 352 may be in a second state 360 when DFCO is being performed.

The graph 320 indicates whether the voltage setting module 260 is being triggered. For example, trace 364 may be in a first state 368 when the voltage setting module 260 is not being triggered. Conversely, the trace 364 may be in a second state 372 when the voltage setting module 260 is being triggered. The graph 324 indicates whether the brake pedal is in the resting position. For example, trace 376 may be in a first state 380 when the brake pedal is in the resting position. Conversely, the trace 376 may be in a second state 384 when the brake pedal is not in the resting position.

At time zero, the commanded voltage 166 is set based on the BCM desired voltage 172. None of the disabling conditions are satisfied at time 386, as indicated by the trace 328 transitioning from the first state 332 to the second state 336, and the triggering module 208 is enabled. At time 388, the accelerator pedal is in the resting position, as indicated by the trace 340 transitioning from the first state 344 to the second state 348. As DFCO is not being performed at time 388, the voltage setting module 260 is not triggered.

At time 390, DFCO is performed, as indicated by the trace 352 transitioning from the first state 356 to the second state 360. Because none of the disabling conditions are present, DFCO is being performed, and the accelerator pedal is in the resting position at time 390, the triggering module 208 triggers the voltage setting module 260 at time 390.

At time 390, the brake pedal is in the resting position (and the brakes are not being applied) as indicated by trace 376. Accordingly, the voltage setting module 260 sets the ECM desired voltage 280 to the first predetermined voltage 392 at time 390. In response to the change in the ECM desired voltage 280 to the first predetermined voltage 392, the voltage control module 284 applies the rate limit and ramps the commanded voltage 166 up to the first predetermined voltage 392 after time 390.

The brake pedal is not in the resting position at time 394, as indicated in the trace 376 transitioning from the first state 380 to the second state 384. In response to the brake pedal being depressed from the resting position, the voltage setting module 260 sets the ECM desired voltage 280 to the second predetermined voltage 396 at time 394. In response to the change in the ECM desired voltage 280 to the second predetermined voltage 396, the voltage control module 284 ramps the commanded voltage 166 up to the second predetermined voltage 396 after time 394.

At time 398, the triggering module 208 stops triggering the voltage setting module 260. The triggering module 208 may stop triggering the voltage setting module 260, for example, when at least one of: (i) the transmission is decoupled from the engine 102; (ii) the A/C load 212 is greater than the first predetermined load; (iii) the friction load is greater than the second predetermined load; (iv) the BCM desired voltage 172 is greater than the predetermined voltage; (v) the accelerator pedal is not in the resting position; and (vi) DFCO is not being performed. The voltage control module 284 then ramps the commanded voltage 166 down to the BCM desired voltage 172. If the triggering module 208 had not stopped triggering the voltage setting module 260 due to at least one of (i)-(vi) above and the brake pedal was returned to the resting position at time 398, the voltage setting module 260 would have set the ECM desired voltage 280 to the first predetermined voltage 392. The voltage control module 284 would have ramped the commanded voltage 166 down to the first predetermined voltage 392.

Figure 4:
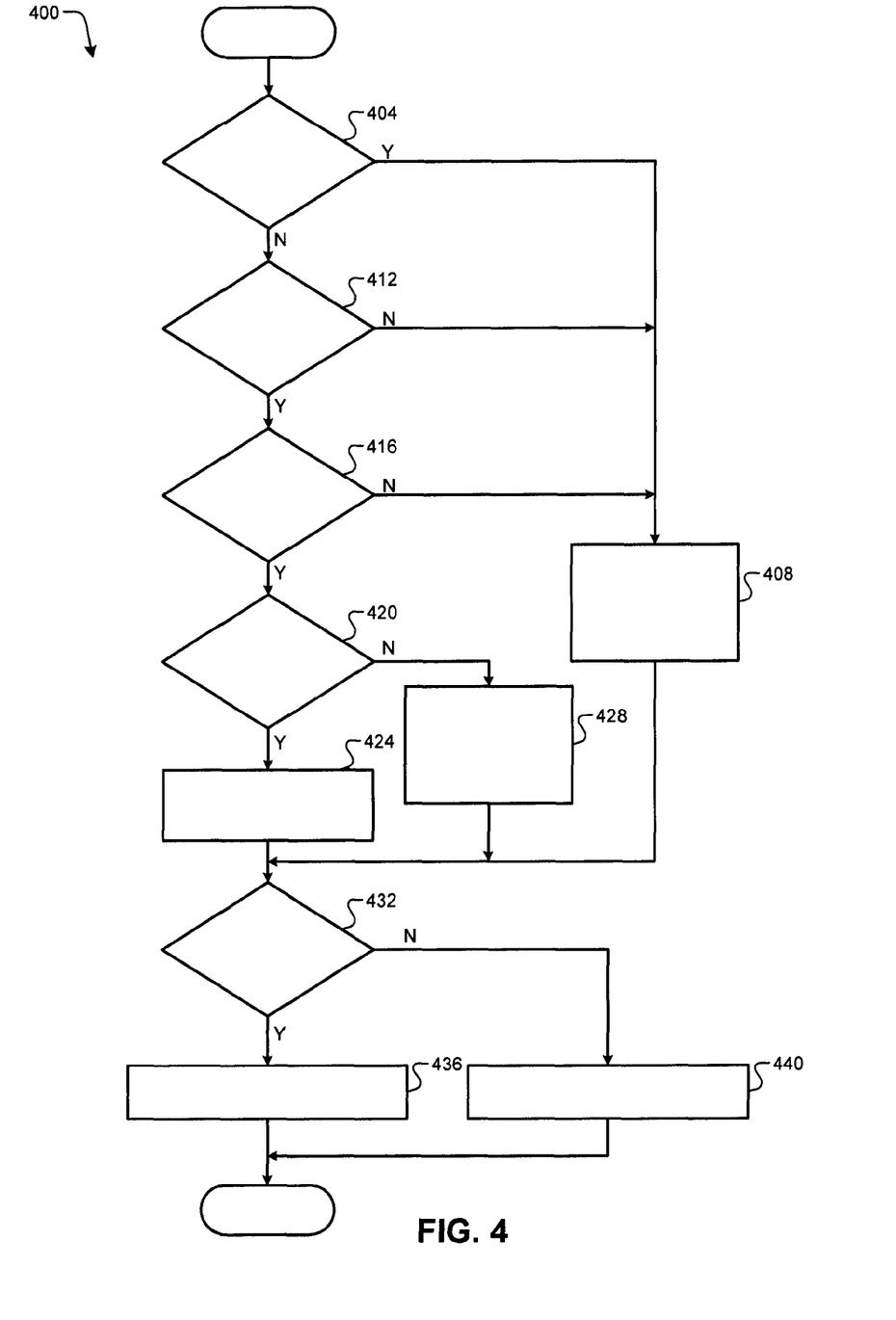
FIG. 4 is a flowchart depicting an example method of controlling the commanded voltage according to the present disclosure.

Referring now to FIG. 4, a flowchart depicting an example method 400 of controlling the commanded voltage 166 for the L-terminal of the alternator 160 is presented. Control may begin with 404 where control determines whether one or more of the disable conditions are met. For example, control may determine whether: (i) the transmission is decoupled from the engine 102; (ii) the A/C load 212 is greater than the first predetermined load; and (iii) the friction load is greater than the second predetermined load. Control may also determine whether (iv) the BCM desired voltage 172 is greater than the predetermined voltage at 404. If at least one of (i)-(iv) are true, control may set the ECM desired voltage 280 equal to the BCM desired voltage 172 at 408, and control may continue to 432. If none of (i)-(iv) are true, control may continue with 412.

At 412, control determines whether the accelerator pedal is in the resting position. If true, control continues with 416. If false, control may set the ECM desired voltage 280 equal to the BCM desired voltage 172 at 408, and control may continue to 432. At 416, control determines whether DFCO is being performed. If true, control continues with 420. If false, control may set the ECM desired voltage 280 equal to the BCM desired voltage 172 at 408, and control may continue to 432.

Control may determine whether the brakes are being applied at 420. If true, control sets the desired ECM voltage 280 equal to the second predetermined voltage at 424, and control continues to 432. If false, control sets the ECM desired voltage 280 equal to the first predetermined voltage at 428, and control continues to 432.

At 432, control determines whether the ECM desired voltage 280 is greater than the BCM desired voltage 172. If true, control adjusts the commanded voltage 166 toward the ECM desired voltage 280 by up to the predetermined amount at 436, and control may end. Control may also notify the BCM 170 that the commanded voltage 166 is not set based on the BCM desired voltage 172. If false, control adjusts the commanded voltage 166 toward the BCM desired voltage 172 by up to the predetermined amount at 440, and control may end. By adjusting the commanded voltage 166 by up to the predetermined amount, control rate limits changes in the commanded voltage 166. While control is shown and discussed as ending, FIG. 4 is illustrative of one control loop and control may return to 404.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. For purposes of clarity, the same reference numbers will be used in the drawings to identify similar elements. As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

What is claimed is:

1. A system for a vehicle, comprising:
   a fuel control module that cuts off fuel to an engine during a deceleration fuel cutoff (DFCO) event;
   a voltage setting module that, in response to being triggered during the DFCO event: monitors a brake pedal position, sets a first desired voltage to a first predetermined voltage when a brake pedal is not depressed, and sets the first desired voltage to a second predetermined voltage when the brake pedal is depressed, wherein the second predetermined voltage is greater than the first predetermined voltage;
   a body control module (BCM) that generates a second desired voltage based on a state of charge (SOC) of a battery and electrical loads;
   a triggering module that does not trigger the voltage setting module when the second desired voltage is greater than a third predetermined voltage, wherein the third predetermined voltage is less than the first predetermined voltage, and that selectively triggers the voltage setting module when the second desired voltage is less than the third predetermined voltage;
   a voltage control module that:
     when the first desired voltage is greater than the second desired voltage, adjusts a commanded voltage toward the first desired voltage at a predetermined rate; and
     when the second desired voltage is greater than the first desired voltage, adjusts the commanded voltage toward the second desired voltage at the predetermined rate,
   wherein a regulator generates a pulse width modulation (PWM) signal based on the commanded voltage and applies the PWM signal to an alternator.

2. The system of claim 1 wherein the triggering module selectively triggers the voltage setting module when the second desired voltage is less than the third predetermined voltage and an accelerator pedal is not depressed during the DFCO event.

3. The system of claim 1 wherein the triggering module selectively triggers the voltage setting module when the second desired voltage is less than the third predetermined voltage and
   an air/conditioning (A/C) load is greater than a predetermined load.

4. The system of claim 3 further comprising an A/C load module that determines the A/C load based on an engine speed, a measured position of a pump of an A/C compressor, and a measured output pressure of the A/C compressor.

5. The system of claim 1 wherein the triggering module selectively triggers the voltage setting module when the second desired voltage is less than the third predetermined voltage and
   the engine is decoupled from a transmission.

6. The system of claim 1 wherein the triggering module triggers the voltage setting module in response to a determination that:
   the second desired voltage is less than the third predetermined voltage;
   an accelerator pedal is not depressed;
   a friction load on the engine is less than a first predetermined load;
   an air/conditioning (A/C) load is less than a second predetermined load; and
   torque is being transferred between the engine and at least one axle.

7. The system of claim 1 wherein the regulator applies the PWM signal to an L-terminal of the alternator.

8. The system of claim 1 wherein the triggering module selectively triggers the voltage setting module when the second desired voltage is less than the third predetermined voltage and
   a friction load on the engine is greater than a predetermined load.

9. The system of claim 2 wherein, when the voltage setting module is not triggered, the voltage setting module sets the first desired voltage equal to the second desired voltage.

10. A method for a vehicle, comprising:
    cutting off fuel to an engine during a deceleration fuel cutoff (DFCO) event; and
    in response to generation of a trigger during the DFCO event:
      monitoring a brake pedal position;
      setting a first desired voltage to a first predetermined voltage when a brake pedal is not depressed; and
      setting the first desired voltage to a second predetermined voltage when the brake pedal is depressed, wherein the second predetermined voltage is greater than the first predetermined voltage;
    generating a second desired voltage based on a state of charge (SOC) of a battery and electrical loads;
    not generating the trigger when the second desired voltage is greater than a third predetermined voltage, wherein the third predetermined voltage is less than the first predetermined voltage;
    selectively generating the trigger when the second desired voltage is less than the third predetermined voltage;
    when the first desired voltage is greater than the second desired voltage, adjusting a commanded voltage toward the first desired voltage at a predetermined rate; and when the second desired voltage is greater than the first desired voltage, adjusting the commanded voltage toward the second desired voltage at the predetermined rate, wherein a regulator generates a pulse width modulation (PWM) signal based on the commanded voltage and applies the PWM signal to an alternator.

11. The method of claim 10 further comprising:

selectively generating the trigger when the second desired voltage is less than the third predetermined voltage and an accelerator pedal is not depressed during the DFCO event; and not generating the trigger when the accelerator pedal is depressed.

12. The method of claim 10 further comprising:

not generating the trigger when an air/conditioning (A/C) load is greater than a predetermined load; and selectively generating the trigger when the second desired voltage is less than the third predetermined voltage and the A/C load is greater than the predetermined load.

13. The method of claim 12 further comprising determining the A/C load based on an engine speed, a measured position of a pump of an A/C compressor, and a measured output pressure of the A/C compressor.

14. The method of claim 10 further comprising:

not generating the trigger when the engine is decoupled from a transmission; and selectively generating the trigger when the second desired voltage is less than the third predetermined voltage and the engine is coupled with the transmission.

15. The method of claim 10 further comprising generating the trigger in response to a determination that:

the second desired voltage is less than the third predetermined voltage;

an accelerator pedal is not depressed;

a friction load on the engine is less than a first predetermined load;

an air/conditioning ( A/C) load is less than a second predetermined load; and torque is being transferred between the engine and at least one axle.

16. The method of claim 10 wherein the regulator applies the PWM signal to an L-terminal of the alternator.

17. The method of claim 10 further comprising:

not generating the trigger when a friction load on the engine is greater than a predetermined load; and selectively generating the trigger when the second desired voltage is less than the third predetermined voltage and the friction load is less than the predetermined load.

18. The method of claim 11 further comprising, when the trigger is not generated, setting the first desired voltage equal to the second desired voltage.

\* \* \* \* \*